(12) United States Patent
Tarroboiro et al.

(10) Patent No.: US 11,005,367 B2
(45) Date of Patent: May 11, 2021

(54) BOOST SPREAD-SPECTRUM TECHNIQUE IN PULSE SKIP MODE WITH FIXED FREQUENCY CLOCK REFERENCE

(71) Applicant: Dialog Semiconductor (UK) Limited, London (GB)

(72) Inventors: Giovanni Tarroboiro, Bientina (IT); Federico Vincis, Leghorn (IT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/790,356

(22) Filed: Oct. 23, 2017

(65) Prior Publication Data
US 2019/0123646 A1 Apr. 25, 2019

(51) Int. Cl.
| | | |
|---|---|---|
| *H02M 3/158* | (2006.01) | |
| *H02M 1/44* | (2007.01) | |
| *H02M 1/08* | (2006.01) | |
| *H02M 1/00* | (2006.01) | |

(52) U.S. Cl.
CPC ............. *H02M 3/158* (2013.01); *H02M 1/08* (2013.01); *H02M 1/44* (2013.01); *H02M 2001/0032* (2013.01)

(58) Field of Classification Search
CPC .......................................... H02M 3/156–1588
See application file for complete search history.

(56) References Cited

U.S. PATENT DOCUMENTS

| | | |
|---|---|---|
| 6,841,983 B2 | 1/2005 | Thomas |
| 7,245,113 B2 | 7/2007 | Chen et al. |
| 7,528,590 B2 | 5/2009 | Wei |
| 8,279,628 B2 * | 10/2012 | Melanson ................. H01F 3/10 363/17 |
| 2008/0136395 A1 * | 6/2008 | Bennett .................... H02M 1/44 323/288 |
| 2011/0018516 A1 * | 1/2011 | Notman .............. H02M 3/1588 323/284 |
| 2013/0057239 A1 * | 3/2013 | Kalje .................. H02M 3/1584 323/271 |
| 2014/0125247 A1 * | 5/2014 | Mitterbacher ...... H02M 1/4225 315/224 |
| 2014/0252995 A1 * | 9/2014 | Chang ....................... H02P 7/29 318/135 |
| 2016/0294294 A1 * | 10/2016 | Ye ..................... H02M 3/33592 |
| 2017/0110967 A1 * | 4/2017 | Trichy .................. H02M 3/158 |
| 2017/0176918 A1 * | 6/2017 | Shimura ........... H02M 3/33507 |

* cited by examiner

*Primary Examiner* — Peter M Novak

(74) *Attorney, Agent, or Firm* — Saile Ackerman LLC; Stephen B. Ackerman

(57) ABSTRACT

A boost DC-DC switching converter architecture is provided, with a spread spectrum technique working in pulse skip mode, and a fixed frequency clock reference, comprising a high side switch and a low side switch, controlled by a voltage or current mode control loop operating in a Pulse Width Modulation (PWM) mode, and having a pulse skip mode. The switching converter comprises an inductor, connected between an input voltage terminal and the high side switch, and also connected to the low-side switch, and a random delay generator, where the random delay generator randomly varies a time for entering, or exiting, or both entering and exiting pulse skip mode, and varies a time where the high side switch is turned off in pulse skip mode.

28 Claims, 14 Drawing Sheets

BOOST SPREAD-SPECTRUM TECHNIQUE IN PULSE SKIP MODE WITH FIXED FREQUENCY CLOCK REFERENCE

BACKGROUND

Field

The disclosure relates generally to a Boost type DC-DC switching power converter, with fixed switching frequency and spread spectrum functionality in pulse skip mode.

Description

Conventionally in a Boost type DC-DC switching converter, dithering is achieved by intentionally applying a form of noise to randomize any quantization error and to spread the frequency content over time to lower the average power spectral density of the main harmonics generated during the DC-DC converter operation. FIG. 1 illustrates dithering functionality implemented using spread spectrum oscillator 100, to generate a variable frequency clock reference fclock, for a Boost switching converter with input voltage VIN, of the prior art. Drawbacks of this configuration include pulse-width modulation (PWM) clock harmonics not being well defined, and being more difficult to filter. The phase relationship with other DC-DC switching converters in the system is more difficult, when the other switching converters receive an un-dithered clock reference. In addition, there are transients on output voltage VOUT of the Boost switching converter, if the clock frequency doesn't change smoothly.

SUMMARY

An object of the disclosure is to provide a Boost DC-DC switching converter architecture that implements a spread spectrum technique when working in pulse skip mode, with a fixed frequency clock reference.

A further object of the disclosure is to maintain performance in pulse-width modulation (PWM) operation.

Still further, another object of the disclosure is to optimize the output voltage ripple during dithered pulse skip operation.

Still further, another object of the disclosure is to minimize output transients.

Still further, another object of the disclosure is to maintain the phase relationship with other DC-DC switching converters in the system.

To accomplish the above and other objects, a boost DC-DC switching converter with fixed frequency input clock reference and spread spectrum technique in pulse skip mode is disclosed, comprising a high side switch and a low side switch, configured to be controlled by a voltage or current control mode loop operating in a PWM (Pulse Width Modulation) mode, and having a pulse skip mode. The switching converter further comprises an inductor, connected between an input voltage terminal and the high side switch, and also connected to the low-side switch, and a random delay generator, where the random delay generator is configured to randomly vary a time for entering, or exiting, or both entering and exiting the pulse skip mode and to randomly vary a time to turn off the high side switch after entering the pulse skip mode.

The above and other objects are further achieved by a method for spreading harmonic content of a boost DC-DC switching converter output. The steps include operating the boost converter in a PWM (Pulse Width Modulation) mode. The steps also include operating a pulse skip mode. The steps also include randomly varying a time to disable the high side switch during the pulse skip time. The steps may also include randomly varying a time for entering, or exiting, or both entering and exiting the pulse skip mode.

In various embodiments the function may be achieved using a NMOS high side device but the disclosed spread spectrum method can be applied also to a boost DC-DC converter implementing a PMOS high side switch.

In various embodiments the function may be achieved using a NMOS low side device.

In various embodiments the function may be achieved using a general random delay generator, implemented here with a 10-bit linear-feedback shift register (LFSR), clocked by the pulse skip signal, as an example. The disclosed spread spectrum method can be used with any other LFSR implementation or different random delay generator topologies.

In various embodiments the function may be achieved using a random delay cell implemented with programmable digital delay blocks driven by a random code generator.

In various embodiments the function may be achieved using a random delay cell implemented with a variable ramp and a comparator. The variable ramp is implemented with a programmable capacitor a driven by a random code generator

DETAILED DESCRIPTION

The present disclosure provides a general Boost DC-DC switching converter architecture, implementing either a voltage mode or a current mode PWM control loop, where a pulse skip time interval is triggered if the duty-cycle falls below a certain threshold, and a frequency dithering functionality has been developed in pulse skip mode using a fixed frequency input clock reference. During the pulse skip time interval, the switching converter discharges the inductor by connecting one end to the output voltage, through a closed high side switch, or body diode when the high side is open, and the other end to the input voltage. In the disclosed method, the time when the high side switch is closed in pulse skip mode is randomized, using a general random delay cell (this is the Ths_off parameter). A random delay cell can also be used to vary the exit pulse skip mode time (this is the Tref_skip parameter, an internally generated reference pulse), in combination with Ths_off. The pulse skip entering condition (this is the MinOn parameter) can also be randomized, in combination with Ths_off and Tref_skip, or just with Ths_off while Tref_skip is kept constant.

Figure 1:
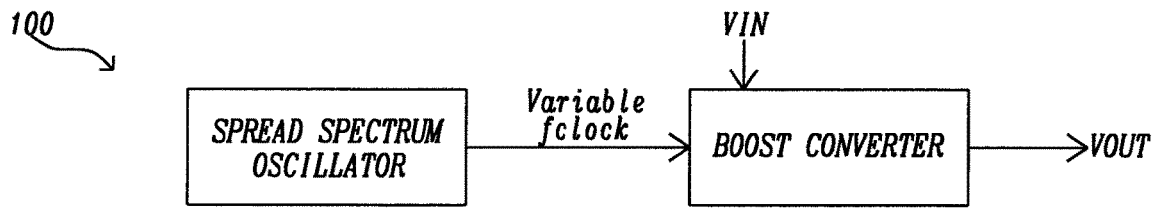
FIG. 1 illustrates dithering implemented using a spread spectrum oscillator, to generate a variable frequency clock reference for a Boost switching converter, of the prior art.
Figure 2:
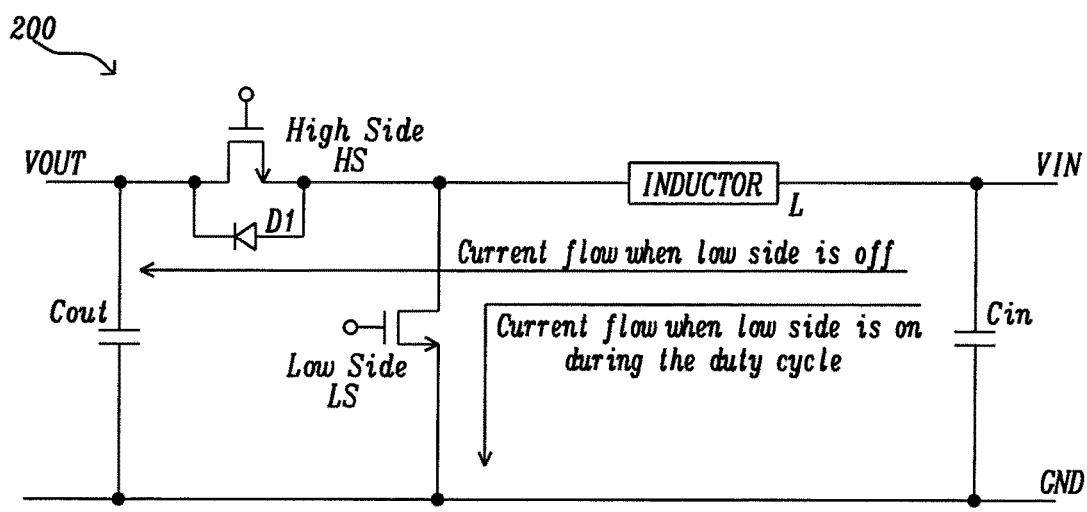
FIG. 2 shows a Boost DC-DC switching reference architecture, for implementing a spread spectrum technique working in pulse skip mode, with a fixed frequency clock reference, embodying the principles of the disclosure.

FIG. 2 illustrates Boost DC-DC switching converter architecture 200, used for implementing a spread spectrum technique working in pulse skip mode, with a fixed frequency clock reference, embodying the principles of the disclosure. When Low Side switch LS is activated, using pulse-width modulation (PWM) at the LS gate, during the Boost duty cycle, inductor L is connected between input voltage VIN and GND. The coil current rises with a slope (VIN-rdsOn_LS*IL)/L, where rdsOn_LS is the resistance of the low side switch. As soon as the low side switch is turned off, the high side switch (also controlled by a PWM signal) is activated, to reduce the power loss on the body diode. The inductor is connected between the high side switch HS source and the input voltage, maintaining the phase relationship with other DC-DC switching converters in the system. The inductor is then discharged through HS if the high side switch is on or through its body diode if off.

Here are the discharge rates for both conditions:
High side device on→discharge slope: (VOUT+rdsOn_hs*IL−VIN)/L
High side device off→discharge slope: (VOUT+Vdiode−VIN)/L Normally the high side device is designed to have rdsOn_hs*IL<<Vdiode, and high side device HS and low side device LS are never on at the same time to avoid cross conduction, using a dedicated non-overlapping circuitry. The drain of HS is at output voltage VOUT (for a NMOS type HS), and its source is at the drain of LS (for a NMOS type HS), and inductor L. The source of LS is at GND, output capacitor Cout is across the output voltage and GND, and input capacitor Cin is across input voltage VIN and GND. In various embodiments the function may be achieved using a NMOS high side and a NMOS low side device or a PMOS high side switch and a NMOS low side. For the PMOS high side case, its source is connected to VOUT and its drain to the LS drain and inductor L, to have the body diode able to conduct current in the direction from the inductor to VOUT.

A pulse skip mode is added to the control circuitry in order to regulate the voltage in a fixed frequency pulse-width modulation (PWM) Boost DC-DC switching converter, when the target duty cycle, or the load current is too low. This will prevent an output voltage drift, when in PWM mode, due to the minimum on (MinOn) time implemented in the switching converter control logic. MinOn/Tclock is the minimum duty cycle for the boost DC-DC switching converter in PWM mode. Additionally a zero cross detection mechanism for inductor current IL is normally implemented to improve efficiency and to avoid reverse current to the source, switching off the high side device, when the direction of the current in the high side is inverted and leaving the body diode to block the reverse current.

A typical application case may be a Boost DC-DC switching converter with a fixed programmable output voltage and an input supply voltage coming from a charging or discharging battery. In such a case, if current is too low or VIN is too close to VOUT, a pulse skip method may be implemented to avoid output voltage drift on VOUT.

The state of low side device LS and high side device HS, during a cycle where Tperiod=1/fpwm_clock (Tp=1/fclk), is described as follows, for both functional modes (PWM and pulse skip), and duty cycle D:

Pulse frequency modulation (PWM):
0<t<D*Tp the low side device is activated, the inductor coil is charged (Dmin=MinOn/Tp, Dmax=Tp−MinOff) and the high side device is off. MinOff is the minimum off time in PWM mode to guarantee that every cycle the coil delivers current to the load.
D*Tp<t<Tp the low side device is disabled, and the high side device is enabled, until the inductor current reverses direction for zero cross detection, or the end of the cycle when the low side device is activated again.

Pulse skip mode:
0<t<Tp the low side device is off for the whole cycle, the inductor coil is never charged during skipped pulse.
The high side device is off for the whole cycle, for the un-dithered case.
The high side device is turned off after a random delay, for the dithering method of the proposed disclosure, or for zero cross detection when the inductor current reverses direction (to block anyway a reverse current to the input).

The pulse skip functionality generates switching patterns, depending on the load, causing harmonics at lower frequencies respect to the PWM reference fixed clock. These harmonics can disturb other circuits in the system or prevent passing EMC standard validation tests. The present disclosure describes a method to reduce the average peak value of these harmonics, spreading their energy on a larger frequency band. Differently from the prior art, the spread spectrum technique is not applied on the reference clock, and the reference clock is now fixed.

Figure 3:
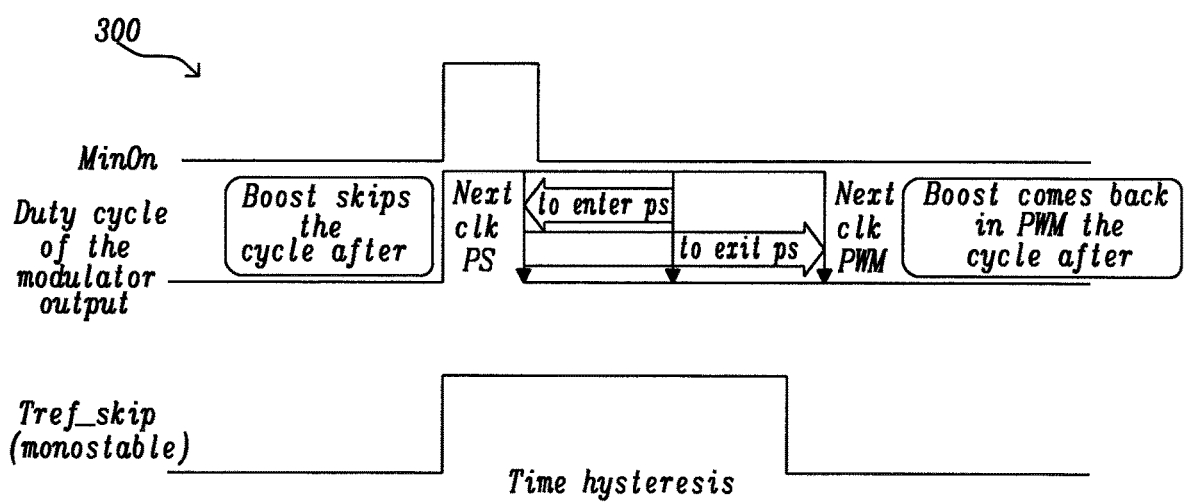
FIG. 3 shows a block diagram of a Boost DC-DC switching converter pulse skip (ps) mechanism that can be used with the spread spectrum technique configuration implemented in FIG. 2.

FIG. 3 shows block diagram 300 of a Boost DC-DC switching converter pulse skip mechanism that can be used with the spread spectrum technique configuration implemented in FIG. 2. Described here are the conditions, evaluated during each clock cycle with Tperiod, to enter and exit pulse skip (ps) mode, where Tperiod=1/fpwm_clock (Tp=1/fclk):

Boost works in PWM with a duty cycle>=MinOn/Tperiod.

If duty cycle<MinOn/Tperiod time, the Boost skips the cycle after.

During each skipped pulse the duty cycle is evaluated again.

If duty cycle>=Tref_skip/Tperiod the Boost comes back in PWM the cycle after.

Conditions are evaluated every clock cycle to decide PWM or pulse skip mode for the cycle following. Tref_skip is a monostable pulse generated by the internal control circuitry providing a time hysteresis respect to the MinOn time (Tref_skip>MinOn).

Figure 4:
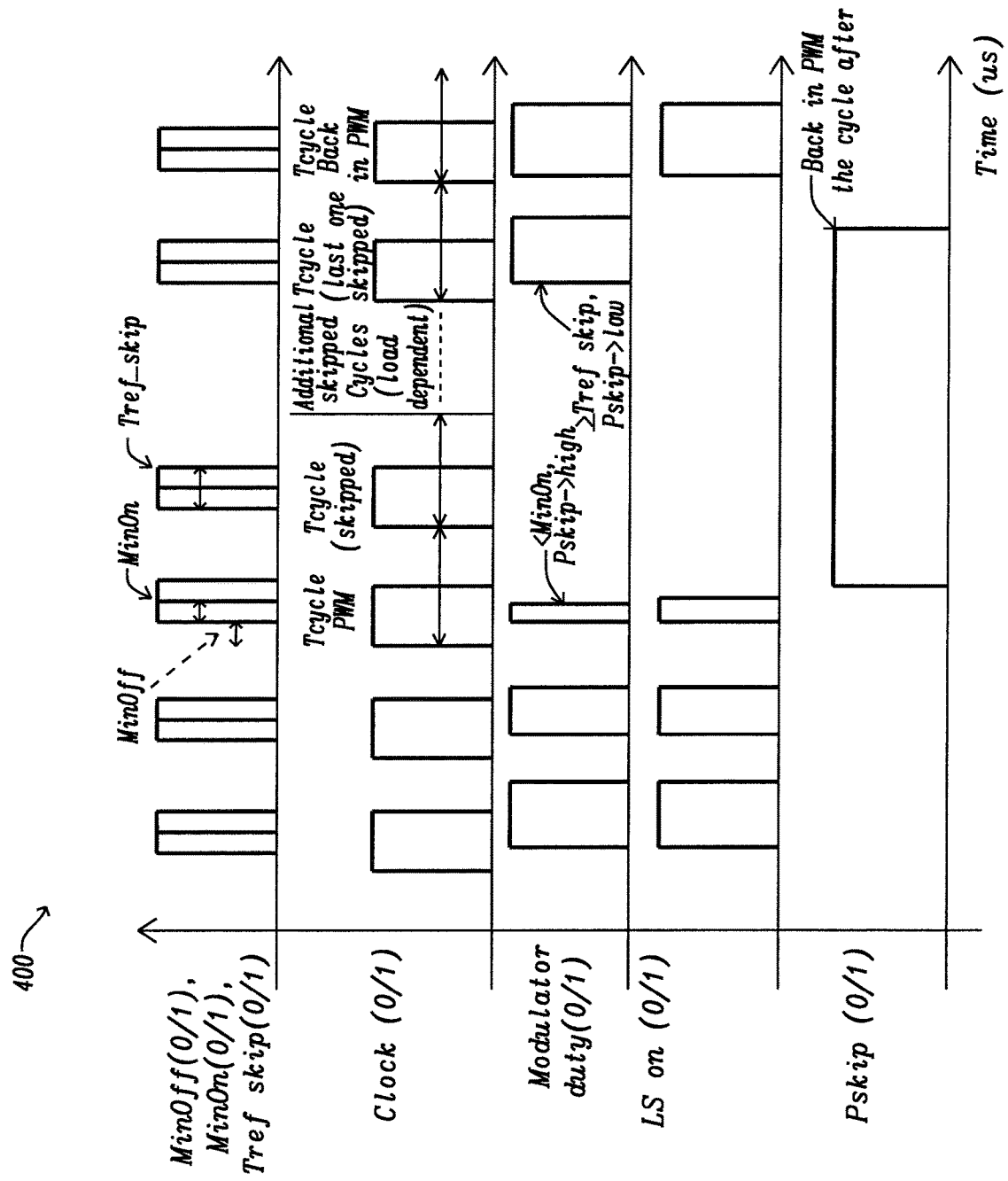
FIG. 4 shows a signal diagram of a Boost DC-DC switching converter pulse skip mechanism for the spread spectrum technique configuration implemented in FIG. 2.

FIG. 4 shows signal diagram 400 of a Boost DC-DC switching converter pulse skip mechanism for the spread spectrum technique configuration implemented in FIG. 2. The MinOn time is normally required to have a reliable over current detection functionality, to protect the external coil, and generally to maintain a reliable coil current feedback for current mode controlled switching converters. The MinOff time is implemented to limit the maximum modulator duty cycle of the switching converter, in order to deliver charge to the load every cycle. The Tref_skip time is designed in a way to guarantee a time hysteresis with respect to the MinOn time, in order to implement an exit condition from pulse skip mode back to PWM mode, when Pskip is active. When the modulator duty cycle of the switching converter is less than the MinOn/Tperiod time, Pskip signal goes high driving the boost in pulse skip mode, for at least the next cycle or in general for more than one cycle. During the pulse skip time, the inductor coil is never charged, as the low side is always off and LS on signal is low. When the duty cycle in pulse skip mode becomes higher than Tref_skip/Tperiod, Pskip signal goes low and boost goes back in PWM the cycle after.

Figure 5:
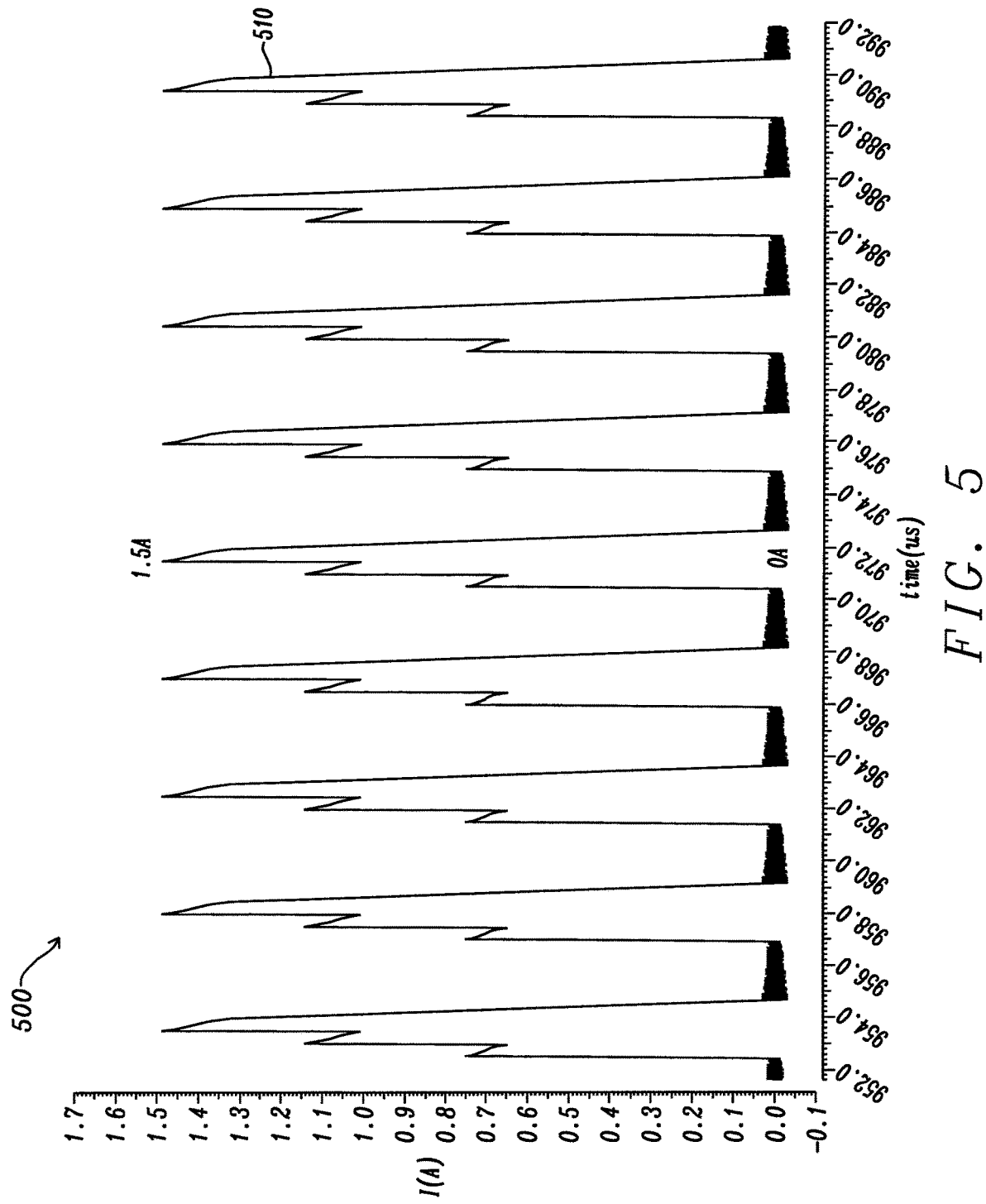
FIG. 5 illustrates a typical inductor coil current signal for the case of intermediate current load, and low VOUT-VIN, without applying any spread spectrum technique.
Figure 6:
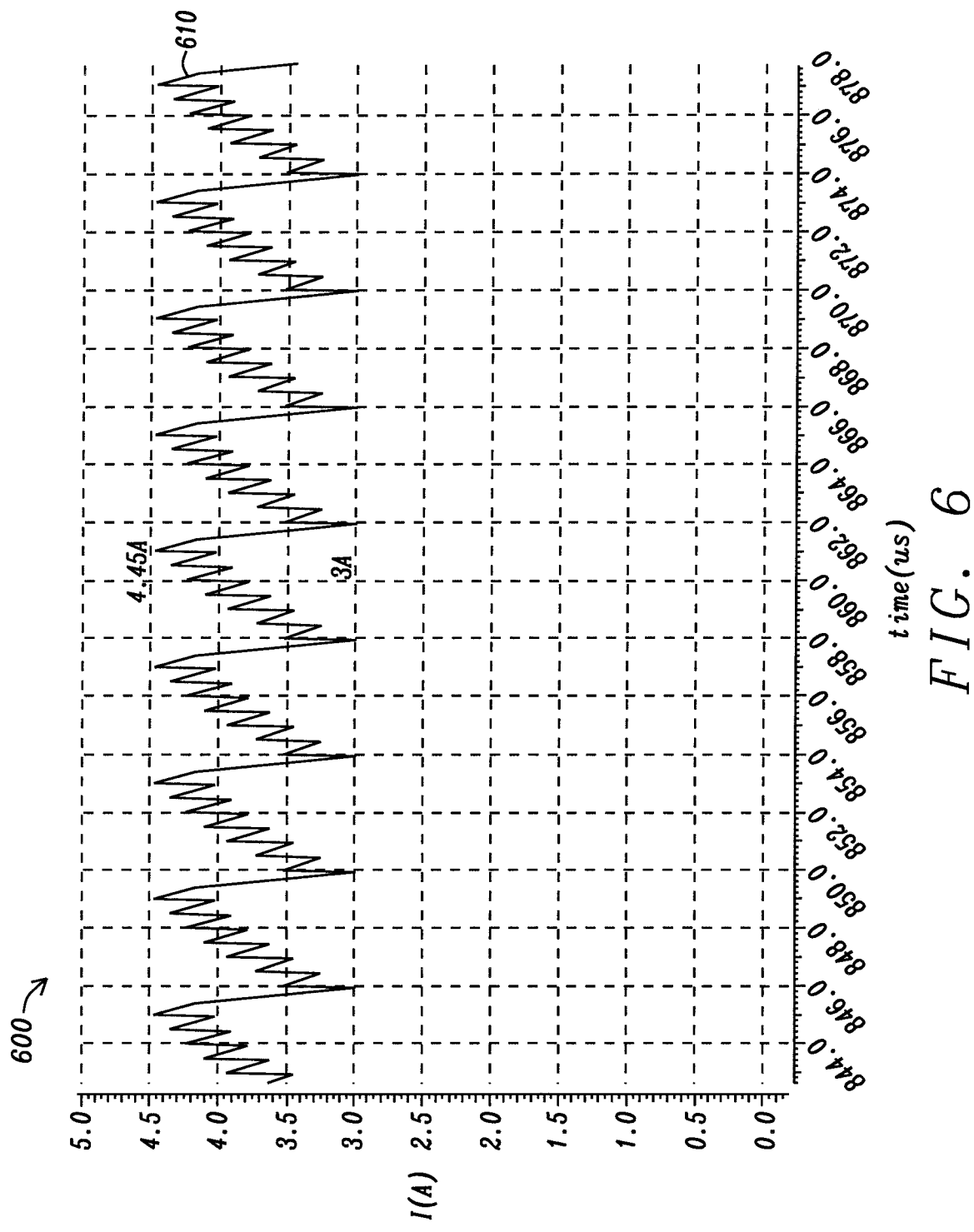
FIG. 6 shows a typical inductor coil current signal for the case of high current load, and low VOUT-VIN, without applying any spread spectrum technique.

Using the proposed pulse skip method, two typical types of external behaviors, depending on the load current, VIN and VOUT, are shown in FIG. 5 and FIG. 6. The working principle of the present disclosure can be understood by observing the current on the inductor of the switching converter.

FIG. 5 illustrates a typical inductor coil current pattern 500 for the case of intermediate current load and low VOUT-VIN, without applying any spread spectrum technique. Burst frequency is constant generating harmonic components in the low frequency range. Such harmonics can disturb other circuits or even generate audio tones for low load current values. The coil current burst has a variation from 0 to 1.5 A in 510. FIG. 6 shows a typical inductor coil current 600 for the case of high current load and low VOUT-VIN without applying any spread spectrum technique. The signal has harmonics at frequencies lower than the reference clock that can affect other electronic systems. The coil current has a variation from 3 A to 4.45 A in 610. Looking at FIG. 5 and FIG. 6, the higher falling slope of the inductor current happens when the high side device is turned off, after pulse skip detection, when Vdiode>rdsOn_hs*IL. For the un-dithered case the time difference between Ths_off and Tskip_high is kept constant.

For a peak current mode converter, for example, the advantage of the disclosed pulse skip method is that current ripple in the inductor, when pulse skipping in high load condition, is well controlled, because only a single pulse is skipped each time and the current never reaches zero. This is the case of FIG. 6, when the coil current average is high enough such that only a single pulse is skipped. During the skipped time LS is off and there is no coil current feedback in the control loop. The presence of a large DC current in the coil causes a duty cycle difference, between the last PWM cycle and the first skipped cycle, high enough to overtake the time hysteresis between Tref_skip and MinOn (Δduty=(Tref_skip−MinOn)/Tperiod). Therefore the boost goes back in PWM the cycle after, skipping only one clock.

As visible in both FIG. 5 and FIG. 6, the typical behavior of the current in the coil for the un-dithered case, when the boost is skipping using the described pulse skipping method, shows a recurring pattern, generating harmonics at different frequencies with respect to the PWM clock frequency, 2 MHz for the simulated case. These harmonics are more difficult to filter and can affect the system. An object of the disclosure is to maintain performance in pulse-width PWM operation, to optimize the output voltage ripple during dithered pulse skip mode, and to minimize output transients inherent in prior art solutions, that rely on changing the input clock frequency.

The proposed spread spectrum technique is used to reduce the average peak value of the harmonics, generated by the coil current time patterns, seen in both FIG. 5 and FIG. 6, maintaining good control of inductor current ripple on IL and output voltage ripple on VOUT. The method requires changing in parallel the variable parameters used for the described pulse skip mechanism, every time the Boost switching converter moves from PWM to pulse skip mode, for Pskip rising edge in FIG. 7, or once every configurable number of pulse skip rising edges, Pskip signal in FIG. 4, by means of a random delay cell driven by a random code generator (pseudo-random LFSR as an example).

Figure 7:
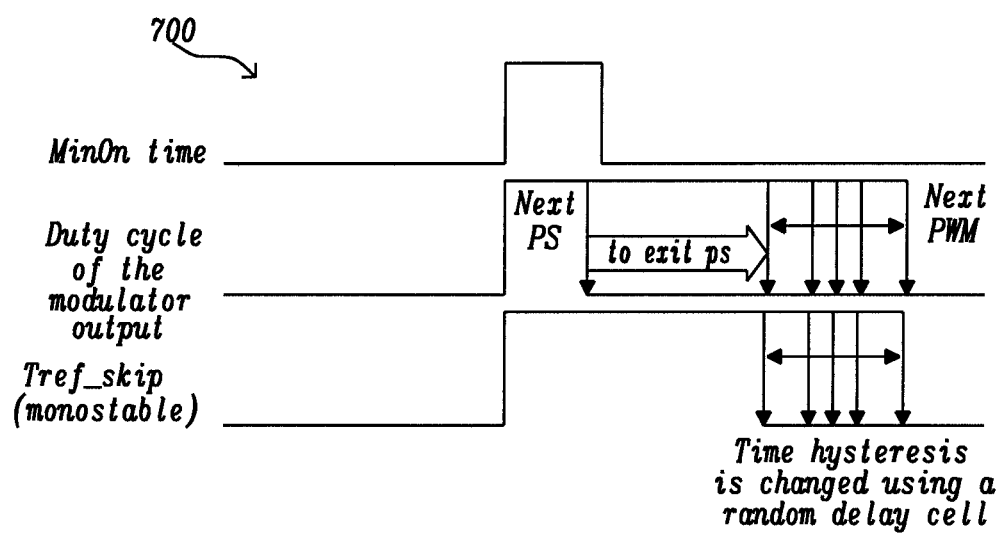
FIG. 7 shows a timing diagram for the disclosed pulse skip dithering method, where a random delay cell is used to vary the Tref_skip time parameter implementing the pulse skip exit mechanism.

FIG. 7 shows a timing diagram for the disclosed pulse skip dithering method 700, where a random delay cell is used to vary the Tref_skip time parameter implementing the pulse skip exit mechanism. Note that in the disclosure, all dithering parameters are active at once, without requiring a sense of the average inductor current. The first parameter randomly changed is Tref_skip, used as the pulse skip (PS) exit condition. The difference between Tref_skip and MinOn, implemented for time hysteresis, sets the pulse skip frequency in a steady state condition, for a certain load current, in the case of low to intermediate loads as in FIG. 5. Modulating Tref_skip with a random delay cell driven by a random code generator, the time between two consecutive PWM bursts is randomized, between a minimum and maximum value, for the depth of dithering modulation.

Figure 8:
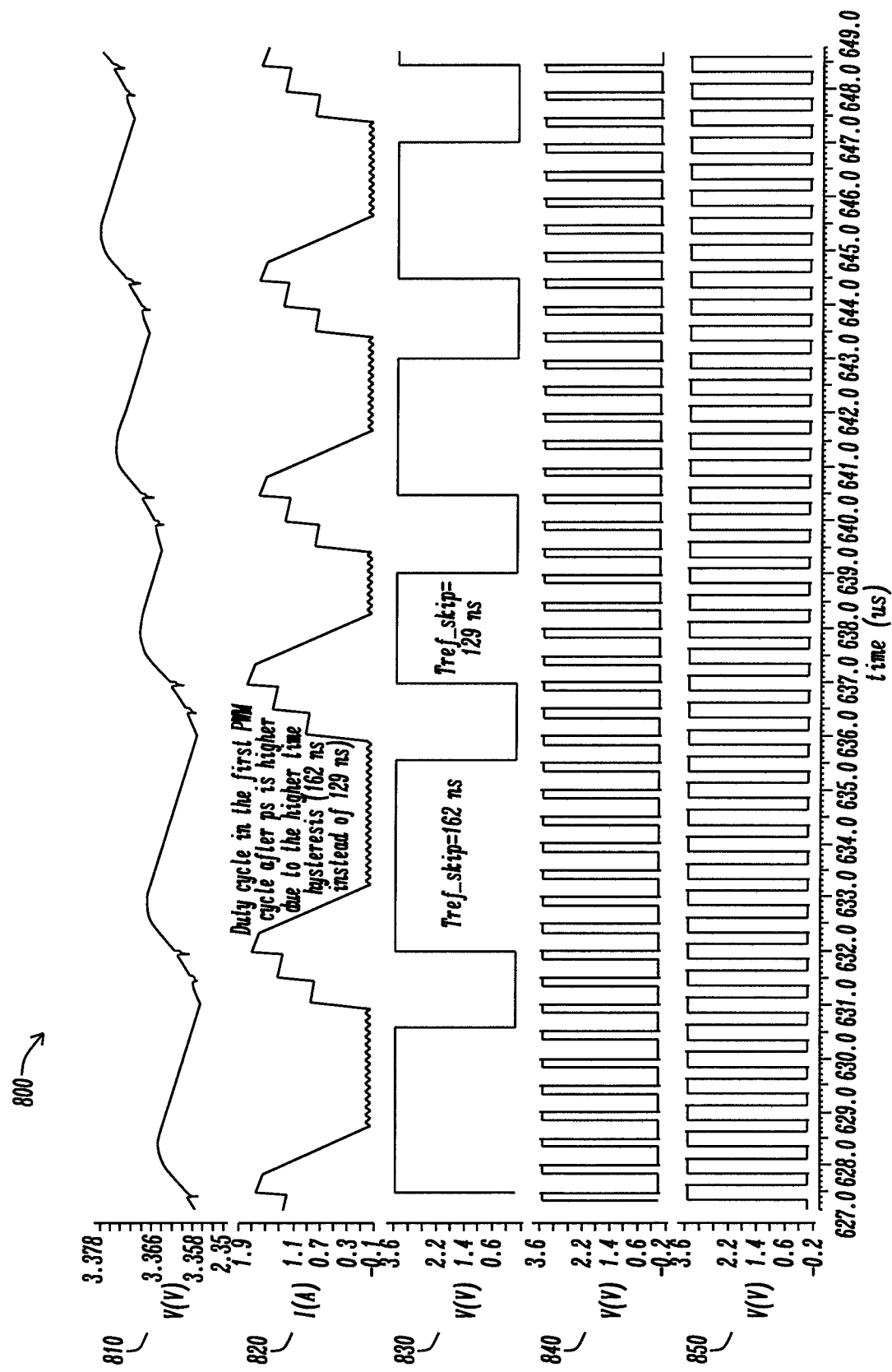
FIG. 8 illustrates a typical signal diagram for the boost working in pulse skip mode with the disclosed dithering mechanism, where a random delay cell is used to vary the Tref_skip parameter.

FIG. 8 illustrates typical signal diagram 800 for the boost working in pulse skip mode with the disclosed dithering mechanism, where a random delay cell is used to vary the Tref_skip parameter. The time between two consecutive bursts is no longer constant and harmonics change over time. The effect on Pskip 830, the pulse skip exit condition, is visible in the simulation waveforms. The proposed pulse skip method will help avoid drift on output voltage VOUT 810, where Tref_skip 840 is modulated for the time between two consecutive PWM bursts of multiple PWM cycles 850. It can be seen that duty cycle, in the first PWM cycle after pulse skip, is higher due to higher time hysteresis, in the skip pulse where Tref_skip is 162 ns instead of 129 ns. Inductor current IL 820 is not charged when the low side device is off, during pulse skip mode. The Tref_skip parameter is updated every time Pskip signal goes high, or once every a configurable number of Pskip rising edges (2, 4, 8 . . . , 128 for example). In case the Tref_skip parameter is changed every Pskip rising edge, the time between two consecutive bursts is always changed.

Figure 9:
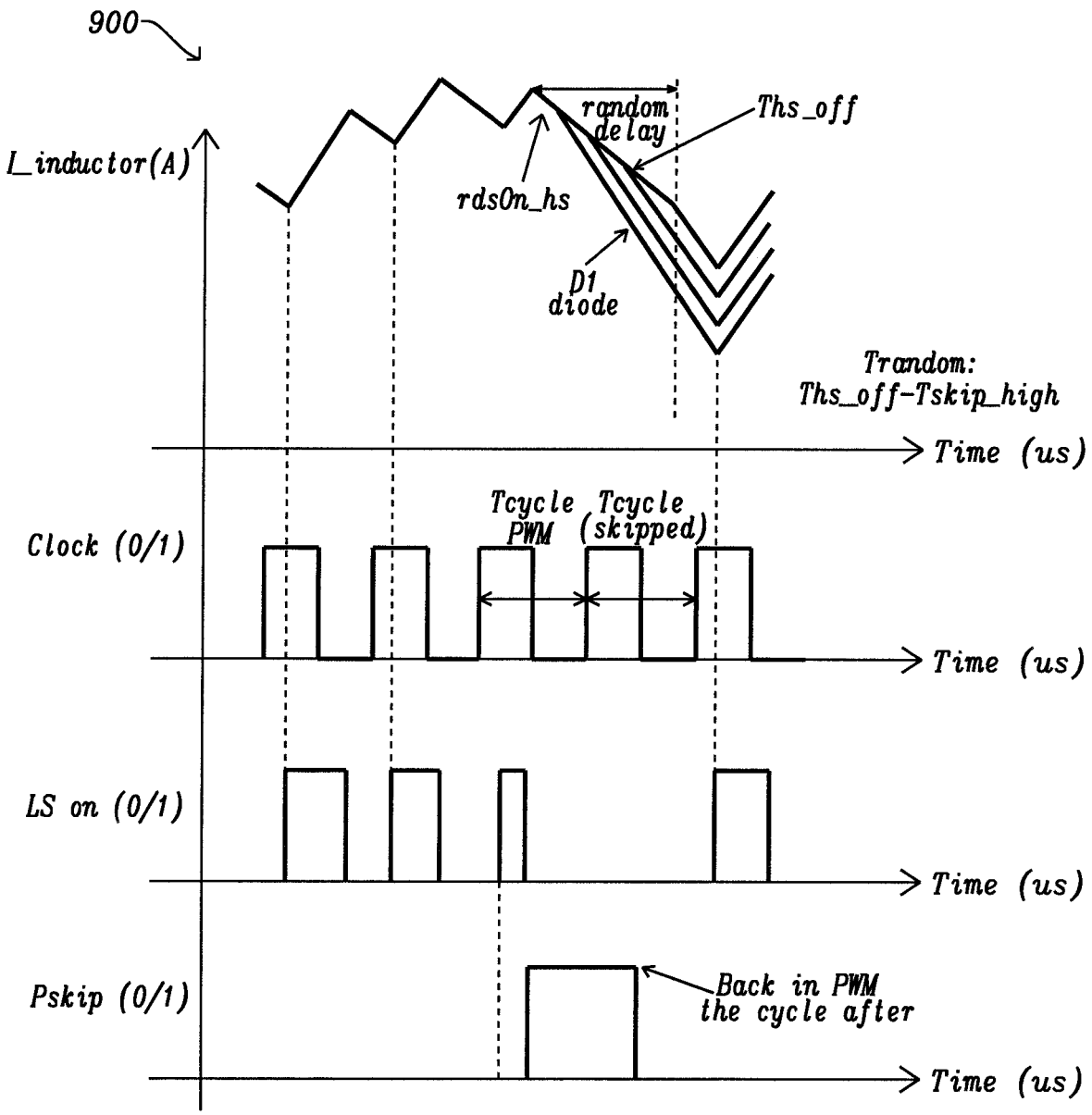
FIG. 9 shows a typical signal diagram for the disclosed high side device off time dithering, where a random delay cell is used to vary the Ths_off-Tskip_high parameter to achieve the spread spectrum functionality for the high current load case when VIN is close to VOUT and the boost switching converter can't regulate the output in PWM due to the MinOn time constraint.

FIG. 9 shows a typical signal diagram 900 for the disclosed high side device on time, with applied dithering in pulse skip mode, where a random delay cell is used to vary the Ths_off-Tskip_high parameter to achieve the spread spectrum functionality for the high current load case when VIN is close to VOUT, and the boost switching converter can't regulate the output in PWM due to the MinOn time constraint. The high side device off time, more important for the medium to high loads of FIG. 6, is the time difference between the high side device turning off time event Ths_off, and pulse skip mode turning on event, when Tskip signal goes high. Using a random delay cell, the falling slope of inductor current IL changes, after a random time Trandom=Ths_off−Tskip_high, because the coil is discharged through the high side body diode.

The error amplifier of the switching converter decides when to turn the low side device off, and if LS on signal goes low during the minimum on time MinOn, Pskip signal goes high, and the cycle after is skipped. The reference clock determines Tcycle for PWM or pulse skip mode.

Note, that a random delay cell can be optionally used, as a possible variation to the proposed technique, to also randomize the MinOn time parameter of FIG. 7, providing that the minimum randomized MinOn time is long enough to guarantee stable current feedback information in the Boost switching converter control loop, and a stable overcurrent detection flag to protect the coil. The random variation of the MinOn time (pulse skip start condition) can be applied in combination with the random variation of the Tref_skip time (pulse skip exit condition) and with the random variation of the Ths_off time (high side switch closed), or just with the random variation of the Ths_off time while Tref_skip is kept constant.

Figure 10:
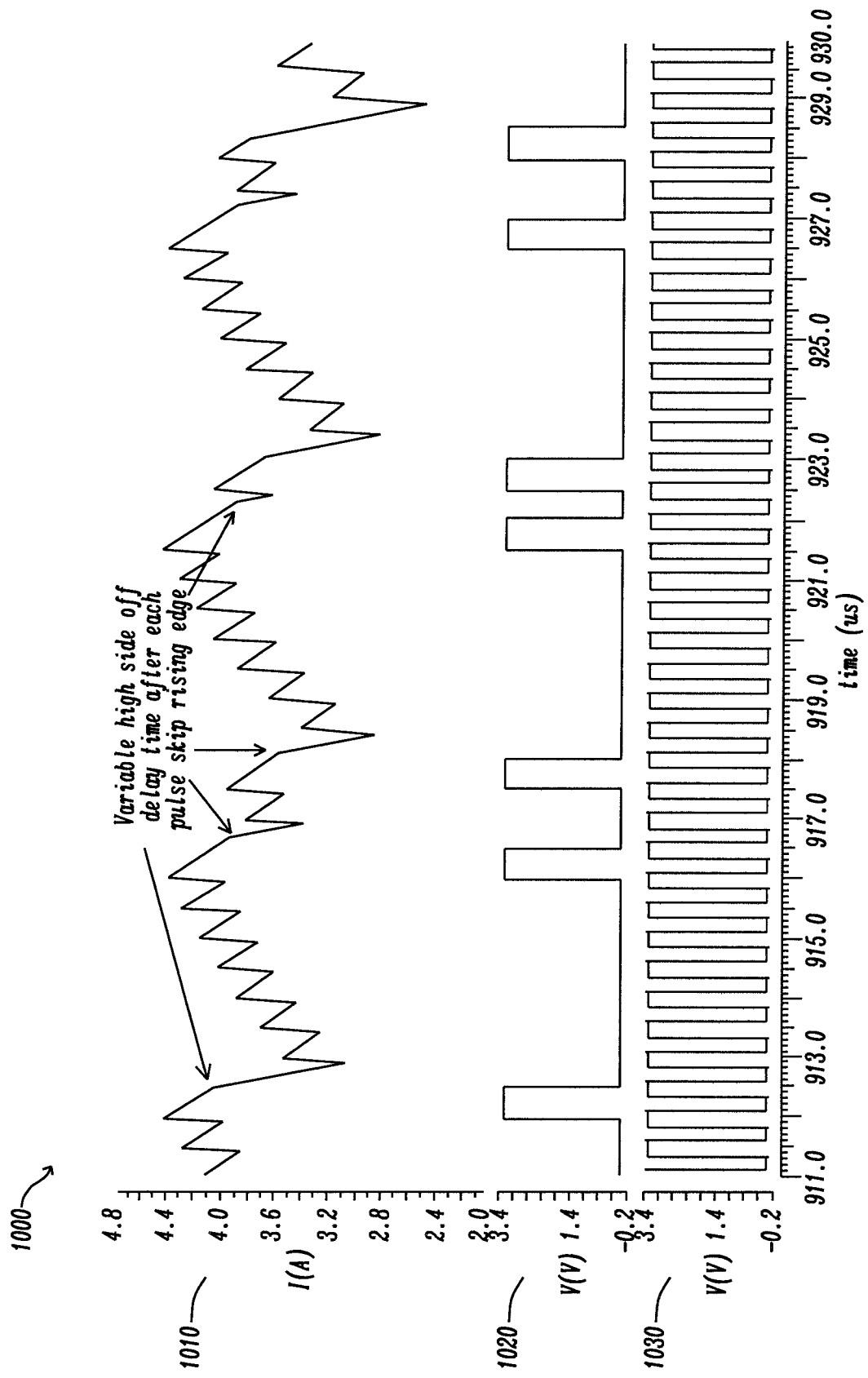
FIG. 10 shows a typical simulation for the high side device off time, with dithering applied, where a random delay cell is used to vary the Ths_off-Tskip_high parameter.

FIG. 10 shows typical simulation 1000 for the high side device off time, with dithering applied, where a random delay cell is used to vary the Ths_off-Tskip_high parameter. Different high side on time in pulse skip mode causes a randomization of the pattern visible in the coil current. Harmonics content are not fixed but vary over time. Inductor current IL 1010, pulse skip signal Pskip 1020, and reference clock Clock 1030 are all shown. Using a random delay cell, the falling slope of inductor current IL changes with Trandom=Ths_off−Tskip_high, where Ths_off and Tskip_high are respectively the time where high side is disabled by the boost embedded logic and the time where pulse skip mode is triggered (Pskip high).

FIG. 10 is an example of the coil current when using the disclosed randomized high side off delay time method, in high load condition, where VIN is close to VOUT. In this condition, the duty required to regulate the voltage in PWM is less than MinOn/Tperiod, and pulse skip is triggered to avoid VOUT drift. A similar result can be obtained also using the following alternative method. The control circuitry first turns off the high side for a random time, where Pskip has a rising edge in FIG. 9 and afterwards turns the high side on again, until the PWM mode is triggered, or until the coil current direction is inverted, causing a zero cross detection. The zero cross detection event disables the high side leaving the body diode to block the reverse current.

Figures 11A, 11B:
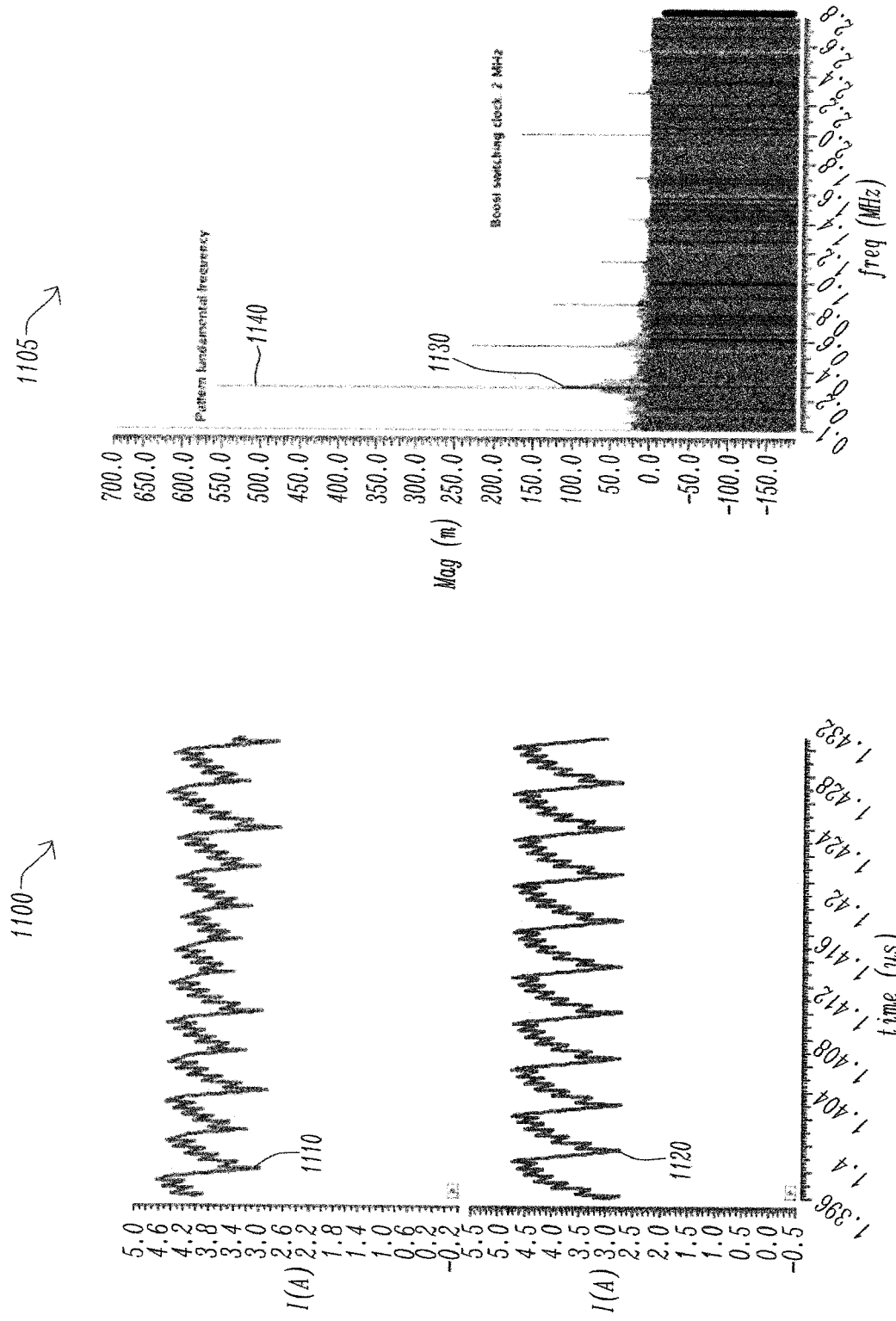
FIG. 11a gives dithering results for a high load current, in a comparison to un-dithered results, for current (A) vs time (ms).
FIG. 11b gives dithering results for a high load current, in a comparison to un-dithered results, for Mag (m) vs freq (MHz).

FIGS. 11a and 11b give dithering results, 1100 and 1105 respectively, for a high load current in a comparison to un-dithered results. The proposed method has been simulated and the results are shown for VOUT=3.4V, VIN=3.3V, IL=3.3 A, fclock=2 MHz, L=0.47 uH. 1110 shows current (A) vs. time (ms), while 1130 shows Mag (m) vs freq (MHz), for the inductor dithered case. 1120 shows current (A) vs time (ms) while 1140 shows Mag (m) vs freq (MHz), for the inductor un-dithered case. For the un-dithered case, the harmonics have a higher average peak value and can affect the system. The dithering of the disclosure optimizes the ripple of the output voltage during dithered pulse skip mode, and minimizes output transients.

Figures 12A, 12B:
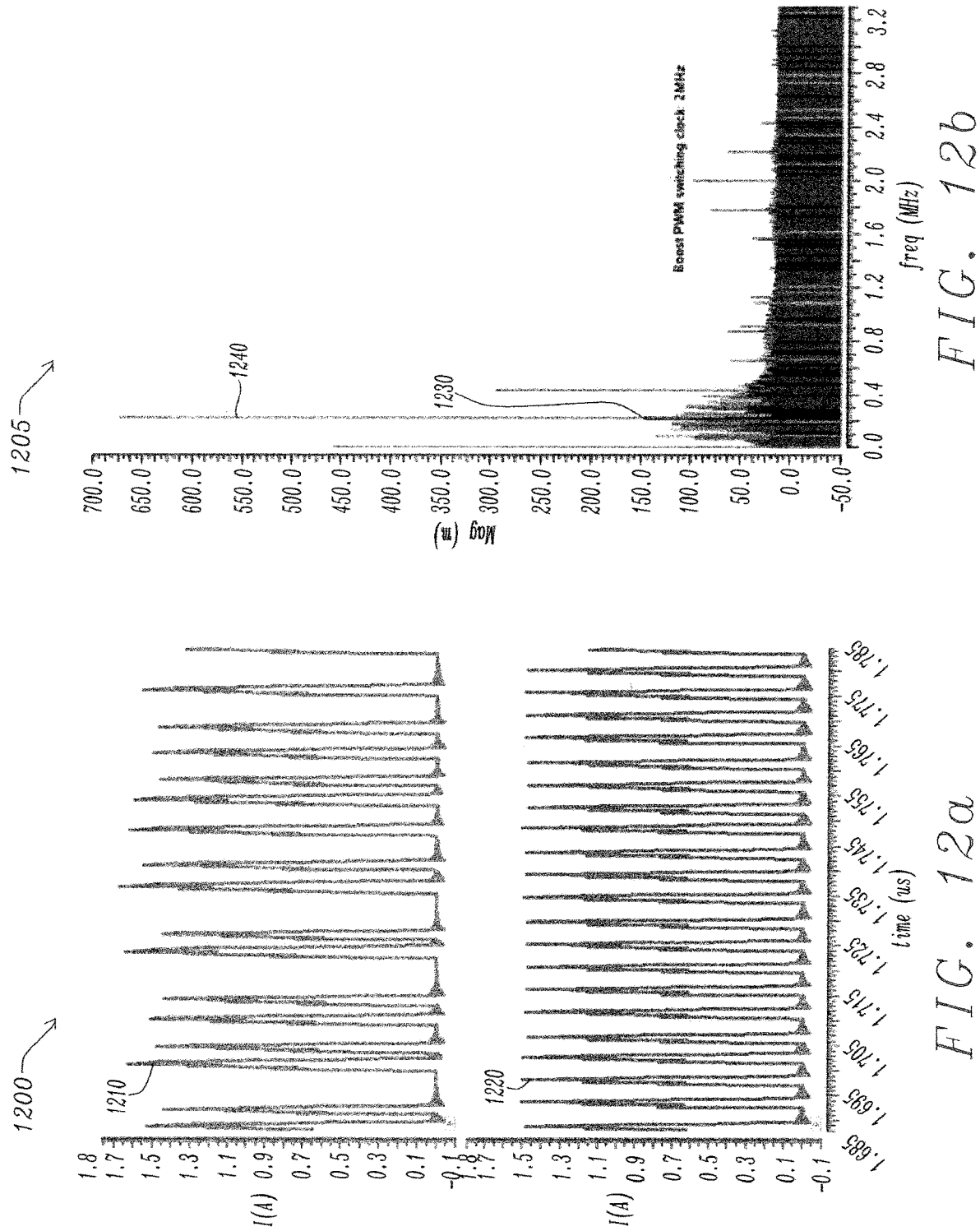
FIG. 12a gives dithering results for an intermediate load current, in a comparison to un-dithered results, for current (A) vs time (ms).
FIG. 12b gives dithering results for an intermediate load current, in a comparison to un-dithered results, for Mag (m) vs freq (MHz).

FIGS. 12a and 12b give dithering results, 1200 and 1205 respectively, for an intermediate load current in a comparison to un-dithered results. The proposed method has been simulated and the results are shown for VOUT=3.4V, VIN=3.3V, IL=0.3 A, fclock=2 MHz, L=0.47 uH. 1210 shows current (A) vs time (ms), while 1230 shows Mag (m) vs freq (MHz), for the inductor dithered case. 1220 shows current (A) vs time (ms), while 1240 shows Mag (m) vs freq (MHz), for the inductor un-dithered case. Again, for the un-dithered case, the harmonics have a higher average peak value and can affect the system. Also, the dithering of the disclosure optimizes the ripple of the output voltage during dithered pulse skip mode, and minimizes output transients.

In summary, FIGS. 11b and 12b represent the DFT transform of the coil current, showing the magnitude of the frequency components of the waveforms. Without dithering, coil current 1120 shows a pattern almost constant, and peak magnitude 1140 of the harmonics of the pattern is high. With dithering activated, coil current 1110 shows a pattern that is no longer constant over time, and maximum peak magnitude 1130 is reduced by a factor of 2.5 to 5 depending on the load state.

Next are some block diagrams of a transistor level implementation of the random delay cells that can be implemented with the proposed disclosure.

Figure 13:
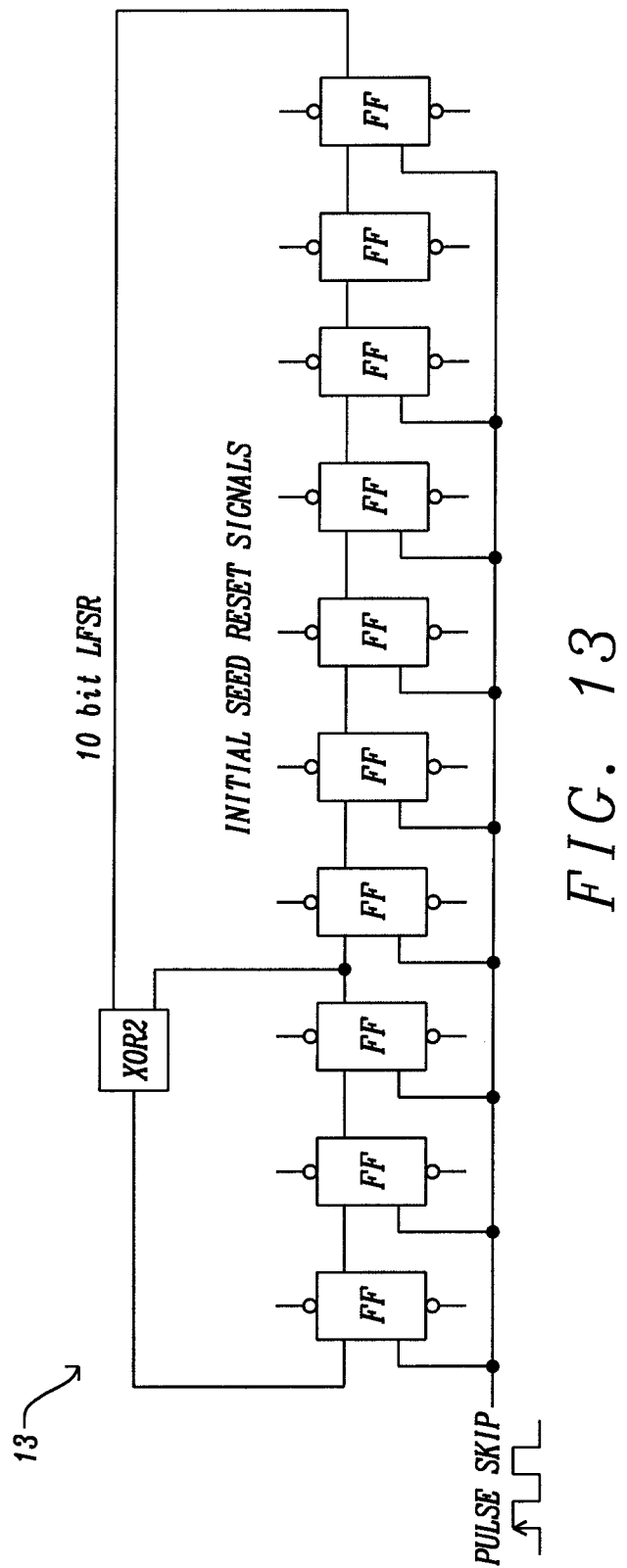
FIG. 13 illustrates an example of a random delay generator implemented with a 10-bit linear-feedback shift register (LFSR), clocked by the pulse skip signal, used to generate the simulation results.

FIG. 13 illustrates an example of random delay generator 1300 implemented with a 10 bit linear-feedback shift register (LFSR), clocked by the pulse skip signal, used to generate the simulation results. The LFSR can be used to generate the pseudo-random sequence needed to change the parameters Tref_skip, Ths_off, and MinOn time, of the Boost DC-DC switching converter. The LFSR can be clocked with the pulse skip signal Pskip itself, to update the parameters after every pulse skip rising edge, or with any frequency division of the same Pskip signal, for example frequency divided by 2, 4, 8 etc. Optionally an uncorrelated clock can be used to change the LFSR, or in general the random delay generator.

Figure 14:
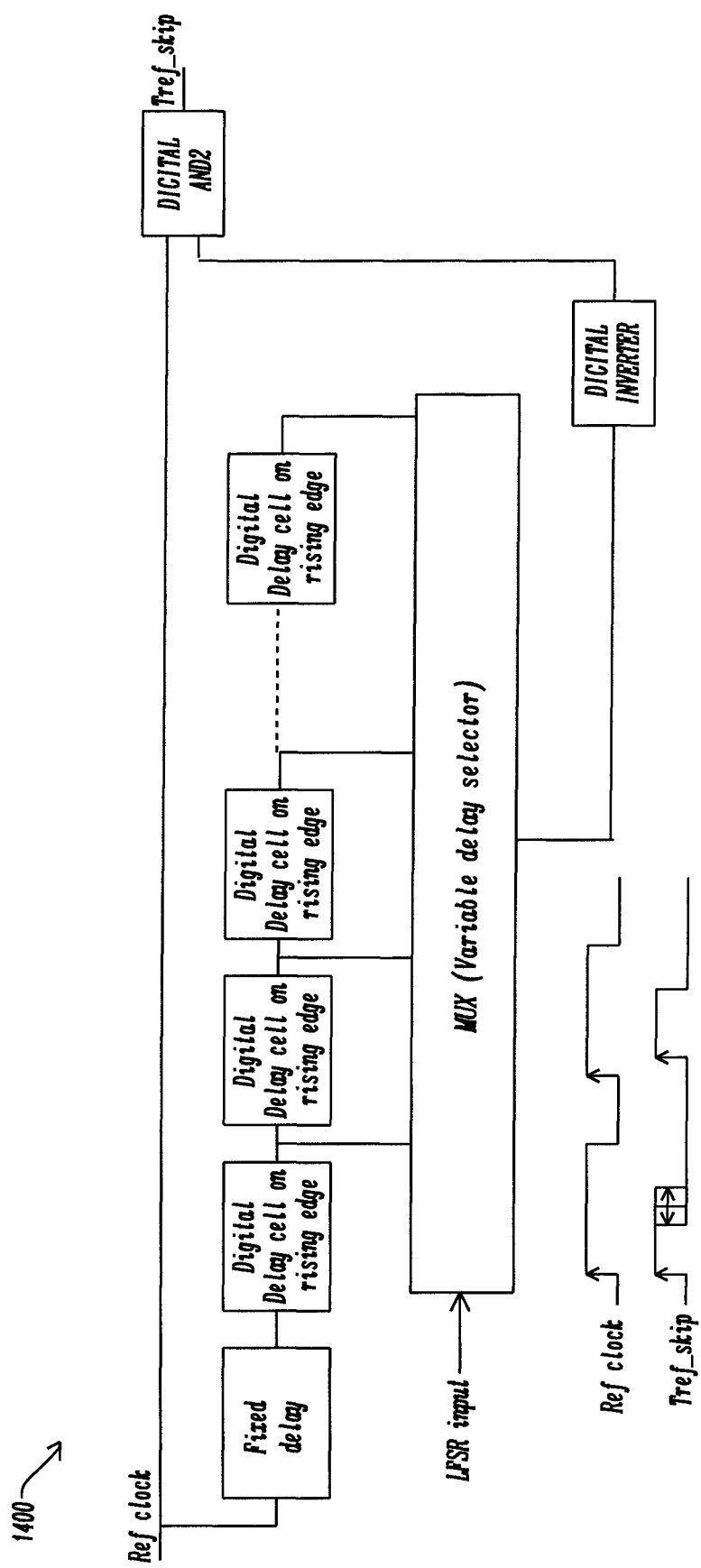
FIG. 14 illustrates an example of a random delay cell implemented with programmable digital delay blocks, driven by a random code generator.

FIG. 14 illustrates an example of random delay cell 1400 implemented with programmable digital delay blocks, driven by a random code generator. The digital delay block can be used to generate the pseudo-random sequence needed to change the parameter Tref_skip, starting from the reference clock Ref clock. The digital delay blocks comprise digital delay cells on the rising edge of the reference clock input to a MUX, which also receives an LFSR input, and outputs a signal to a digital inverter, which is input to a digital AND. This logic configuration can be used to generate the Tref_skip signal in pulse skip mode.

Figure 15:
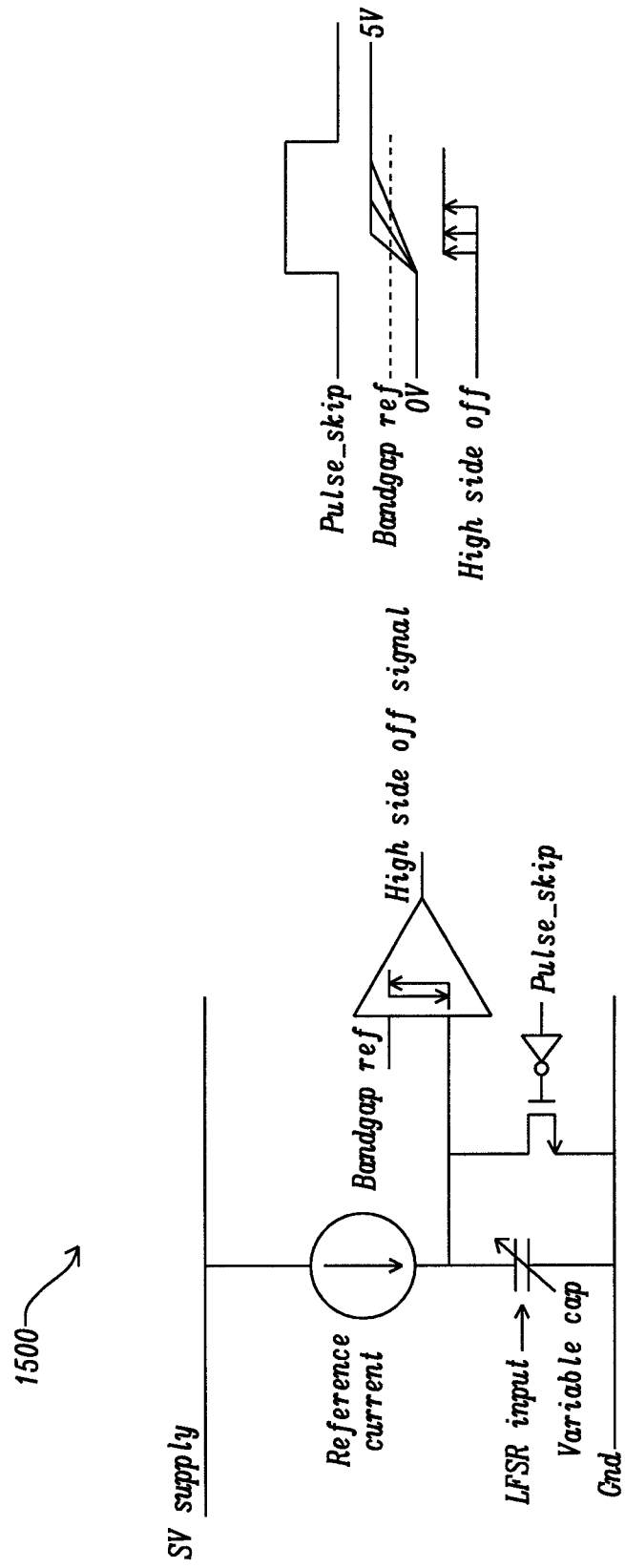
FIG. 15 illustrates an example of a random delay cell implemented with a variable ramp and comparator where a configurable capacitor, driven with a random code generator, is charged with a constant current.

FIG. 15 illustrates an example of random delay cell 1500 implemented with a variable ramp and comparator where a configurable capacitor, driven with a random code generator, is charged with a constant current. The ramp and comparator can be used to generate the pseudo-random sequence needed to change the parameter Tref_Skip, to exit pulse skip mode, achieving a lower spread over process, voltage and temperature, and the parameter Ths_off for the boost high side turn off event after pulse skip detection. A similar approach with a variable ramp can be used to optionally change the MinOn time parameter to enter pulse skip. The delay cell comprises a reference current and a LFSR driving a variable capacitor, and a comparator, the output of the comparator providing a high side device off signal in FIG. 15. For MinOn and Tref_skip the block diagram of the working principle is similar.

Figure 16:
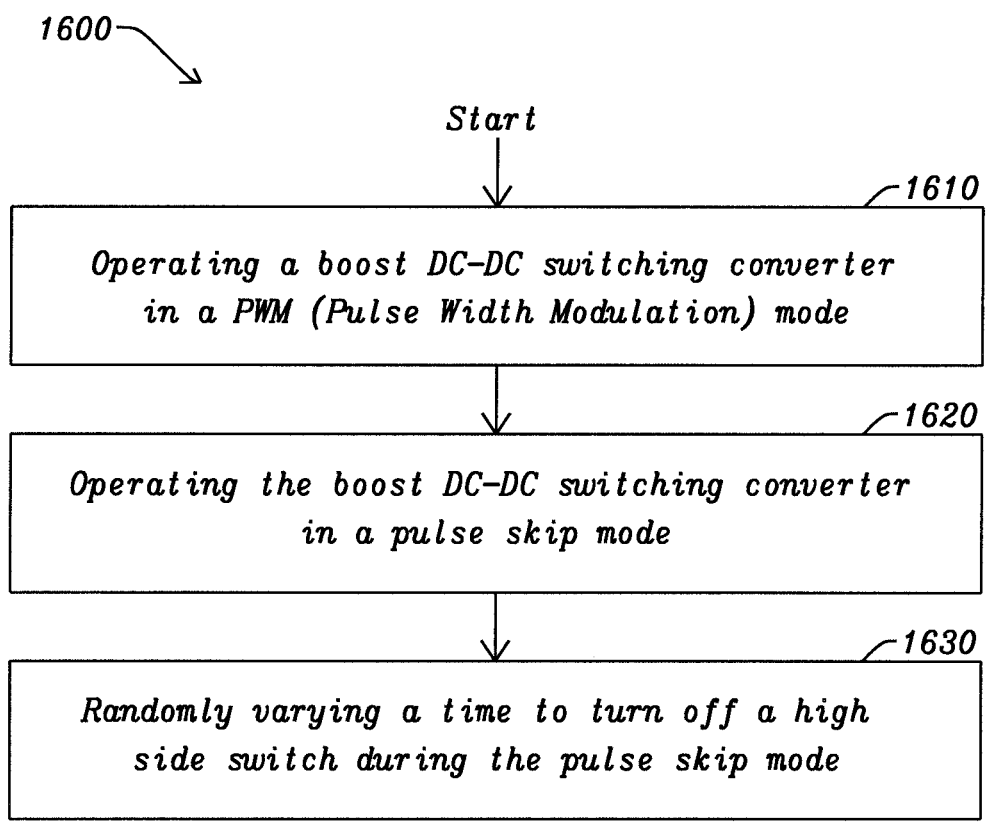
FIG. 16 is a flow chart of the disclosed method for a Boost DC-DC switching converter configuration, implementing a spread spectrum technique working in pulse skip mode, with a fixed frequency clock reference.

FIG. 16 is flow chart 1600 of the disclosed method for spreading harmonic content of a boost DC-DC switching converter output. The steps include 1610 operating the boost DC-DC switching converter in a PWM (Pulse Width Modulation) mode. The steps also include 1620 operating the boost DC-DC switching converter in a pulse skip mode. The steps also include 1630 randomly varying a time to turn off a high side device during the pulse skip mode.

Three variations of the flow are therefore possible for the disclosed spread spectrum method in pulse skip mode: 1) randomize a time for entering pulse skip mode 2) randomize a time for exiting pulse skip mode 3) randomize a time for entering and a time for exiting pulse skip mode. In each of the three flows a time for turning off the high side device after entering pulse skip mode is always randomized.

The advantages of one or more embodiments of the present disclosure include maintaining performance in pulse-width modulation (PWM) operation. Another object of the disclosure is optimizing the ripple of the output voltage during dithered pulse skip operation and minimizing poor output transients inherent in prior-art solutions that rely on changing input clock frequency. Another object of the disclosure is maintaining the phase relationship with other DC-DC switching converters in the system.

While this invention has been particularly shown and described with reference to the preferred embodiments thereof, it will be understood by those skilled in the art that various changes in form and details may be made without departing from the spirit and scope of the invention.

The invention claimed is:

1. A boost DC-DC switching converter with fixed frequency input clock reference and spread spectrum technique in pulse skip mode, comprising:
   a high side switch and a low side switch, configured to be controlled by a voltage or current control mode loop operating in a PWM (Pulse Width Modulation) mode, and having a pulse skip mode;
   an inductor connected between an input voltage terminal and said high side switch, and also connected to said low-side switch; and
   a random delay generator,
wherein said switching converter is configured to evaluate during each clock cycle whether to resume said PWM mode, or to continue said pulse skip mode, and to randomly vary a time for turning off said high side switch after entering said pulse skip mode, using said random delay generator, such that a time between two consecutive PWM bursts is randomized, between a minimum and maximum value, and wherein a randomly varying a time for exiting said pulse skip mode comprises randomizing a time between PWM operations between a minimum and maximum value, by randomizing a difference between an internally generated reference time pulse and a minimum on time of said converter, to exit said pulse skip mode.

2. The switching converter of claim 1, wherein said random delay generator is configured to randomly vary a time for entering said pulse skip mode.

3. The switching converter of claim 2, wherein said time for entering said pulse skip mode is configured to be a minimum on time of said switching converter.

4. The switching converter of claim 1, wherein said random delay generator is configured to randomly vary a time for entering and a time for exiting said pulse skip mode.

5. The switching converter of claim 1, wherein said switching converter is configured to randomly vary a time for entering, or exiting, or entering and exiting said pulse skip mode, and said time for turning off said high side switch after entering said pulse skip mode, every time said pulse skip mode is about to be entered.

6. The switching converter of claim 1, wherein said switching converter is configured to randomly vary a time for entering, or exiting, or entering and exiting said pulse skip mode, less often than every time said pulse skip mode is about to be entered, with a configurable frequency.

7. The switching converter of claim 1, wherein said pulse skip mode is configured to trigger if a duty-cycle falls below a certain threshold.

8. The switching converter of claim 1, wherein said switching converter is configured to exit said pulse skip mode if a duty-cycle is higher than said internally generated reference time pulse.

9. The switching converter of claim 1, further comprising an input capacitor configured across said input voltage terminal and ground.

10. The switching converter of claim 1, further comprising an output capacitor configured across an output voltage terminal and ground.

11. The switching converter of claim 1, wherein said inductor is connected between said input voltage terminal and said output voltage terminal when said high side switch is closed, and connected between said input voltage terminal and ground when said low side switch is closed.

12. The switching converter of claim 1, wherein said random delay generator is configured to provide a time to exit said pulse skip mode, and to provide a time to turn off said high side switch in pulse skip mode, and to provide a minimum on time of said switching converter.

13. The switching converter of claim 1, wherein said switching converter is configured to maintain a phase relationship with other DC-DC switching converters in a system using a fixed frequency reference clock.

14. The switching converter of claim 1, wherein said high side switch is a NMOS or PMOS device.

15. The switching converter of claim 1, wherein said low side switch is a NMOS device.

16. The switching converter of claim 1, wherein said random delay generator comprises a linear feedback shift register (LFSR).

17. The switching converter of claim 1, wherein said random delay generator comprises digital programmable delay blocks driven by a random code generator.

18. The switching converter of claim 1, wherein said random delay generator comprises a variable ramp and comparator, wherein said variable ramp employs a programmable capacitor driven by a random code generator.

19. A method for spreading harmonic content of a boost DC-DC switching converter output, comprising the steps of:

operating said boost DC-DC switching converter in a PWM (Pulse Width Modulation) mode;

operating said boost DC-DC switching converter in a pulse skip mode;

evaluating during each clock cycle whether to resume said PWM mode, or to continue said pulse skip mode; and randomly varying a time to turn off a high side switch during said pulse skip mode, such that a time between two consecutive PWM bursts is randomized, between a minimum and maximum value, and wherein a time for exiting said pulse skip mode is a randomized time between PWM operations between a minimum and maximum value, determined by a difference between an internally generated reference time pulse and a minimum on time of said converter, to exit said pulse skip mode.

20. The method of claim 19, wherein a time for entering said pulse skip mode is randomly varied.

21. The method of claim 20, wherein said time for entering said pulse skip mode is a minimum on time of said switching converter.

22. The method of claim 19, wherein a time for entering and a time for exiting said pulse skip mode is randomly varied.

23. The method of claim 19, wherein a random delay generator randomly varies a time for entering, or exiting, or entering and exiting said pulse skip mode, and said time for turning off said high side switch during said pulse skip mode, every time said pulse skip mode is about to be entered.

24. The method of claim 19, wherein said random delay generator randomly varies a time for entering, or exiting, or entering and exiting said pulse skip mode, less often than every time said pulse skip mode is about to be entered, with a configurable frequency.

25. The method of claim 19, wherein said pulse skip mode triggers if a duty-cycle falls below a certain threshold.

26. The method of claim 19, wherein said switching converter exits said pulse skip mode if a duty-cycle is higher than said internally generated reference time pulse.

27. The method of claim 23, wherein said random delay generator provides a time to exit said pulse skip mode, and provides a time to turn off said high side switch in pulse skip mode, and provides a minimum on time of said switching converter.

28. The method of claim 19, wherein said switching converter maintains a phase relationship with other DC-DC switching converters in a system using a fixed frequency reference clock.

* * * * *